(12) United States Patent
Badimon (10) Patent No.: US 9,507,879 B2
(45) Date of Patent: Nov. 29, 2016

(54) QUERY FORMATION AND MODIFICATION

(71) Applicant: Adobe Systems Incorporated, San Jose, CA (US)

(72) Inventor: Mathieu René Badimon, New York, NY (US)

(73) Assignee: Adobe Systems Incorporated, San Jose, CA (US)

( * ) Notice: Subject to any disclaimer, the term of this patent is extended or adjusted under 35 U.S.C. 154(b) by 275 days.

(21) Appl. No.: 14/146,607

(22) Filed: Jan. 2, 2014

(65) Prior Publication Data

US 2015/0186551 A1 Jul. 2, 2015

(51) Int. Cl.
*G06F 17/30* (2006.01)

(52) U.S. Cl.
CPC ............... *G06F 17/30976* (2013.01)

(58) Field of Classification Search
CPC ................................ G06F 17/30976
See application file for complete search history.

(56) References Cited

U.S. PATENT DOCUMENTS

| | | | |
|---|---|---|---|
| 8,577,913 B1* | 11/2013 | Hansson | G06F 17/30 707/767 |
| 2009/0282033 A1* | 11/2009 | Alshawi | G06F 17/30967 |
| 2013/0339380 A1* | 12/2013 | Meschkat | G06F 17/30864 707/767 |
| 2014/0172562 A1* | 6/2014 | Weatherford | G06Q 30/0256 705/14.54 |

* cited by examiner

*Primary Examiner* — Etienne Leroux
*Assistant Examiner* — Dara J Glasser
(74) *Attorney, Agent, or Firm* — Wolfe-SBMC (57) ABSTRACT

Query formation and modification techniques are described. In one or more embodiments, a query is received that is formed in a text field as a phrase in a human-readable language that includes a visual indicator that represents a missing term that is a subject of the query. Based on the query, a defined database is searched, and one or more modified versions of the phrase are presented that replace the visual indicator with a respective result of the searching. In addition, one or more options are presented that are selectable to automatically complete the phrase as a sentence in the human-readable language.

20 Claims, 10 Drawing Sheets

Carmello J. scored 39 points against the Charlotte Shoes on May 12th http://fa.ct/39559

1 Sports Team                                    #1 Sports Team 101 – Charlotte Shoes 108

| | POS | MIN | FG | 3P | FT | RBD | AST | STL | BLK | TO | PF | +/- | PTS |
|---|---|---|---|---|---|---|---|---|---|---|---|---|---|
| Carmello J. | F | 45 | 14-32 | 4-9 | 7-9 | 8 | 5 | 1 | 1 | 3 | 3 | -2 | 39 |
| Kevin W. | F | 9 | 3-4 | 0-0 | 0-0 | 2 | 0 | 2 | 0 | 0 | 0 | -10 | 6 |
| Tom C. | C | 38 | 3-8 | 0-0 | 3-6 | 18 | 2 | 1 | 1 | 2 | 3 | -5 | 9 |
| James T. | G | 20 | 0-6 | 0-1 | 0-0 | 4 | 0 | 0 | 0 | 1 | 1 | -21 | 0 |
| Julio B. | G | 17 | 4-7 | 2-2 | 1-2 | 2 | 1 | 3 | 0 | 0 | 2 | -4 | 11 |
| Anthony R. | F | 19 | 2-4 | 0-0 | 1-2 | 1 | 0 | 0 | 0 | 0 | 5 | -11 | 5 |
| Chris C. | F | 6 | 0-2 | 0-1 | 0-0 | 0 | 0 | 0 | 0 | 0 | 0 | +1 | 0 |
| Braden G. | F | 17 | 2-3 | 2-3 | 0-0 | 2 | 1 | 0 | 0 | 0 | 2 | -19 | 6 |
| Peter P. | G | 30 | 5-7 | 2-3 | 0-0 | 1 | 3 | 1 | 0 | 5 | 6 | +5 | 12 |
| William J. | G | 39 | 4-17 | 1-3 | 4-4 | 3 | 1 | 0 | 1 | 1 | 6 | -7 | 13 |

More game details

QUERY FORMATION AND MODIFICATION

BACKGROUND

Traditional techniques that were employed to provide data in a data-driven website may be challenging and time consuming for a user to locate particular data. For example, the user may navigate through a complex interface of listings, tabs, sorting options, etc., to extract the particular data. With ever increasing data, the user may become frustrated with the time it takes to locate the particular data. In some cases, the user may provide a query, and receive results that may include what seem to be random results with little to no relation to the actual query. Thus, traditional techniques that were used to provide data to a user using a complex query may limit the usefulness of the search.

SUMMARY

Query formation and modification techniques are described. In one or more embodiments, a query is received that is formed in a text field as a phrase in a human-readable language. The phrase may include a visual indicator representing a missing term that is a subject of the query. Based on the query, a defined database is searched, and one or more modified versions of the phrase are presented that replace the visual indicator with a respective result of the searching. In addition, one or more options are presented that are selectable to automatically complete the phrase as a sentence in the human-readable language.

In at least one embodiment, an input is received that includes one or more text characters. A user is assisted in forming a query as a phrase in a human-readable language based on the text characters being used to generate suggested phrases that are user-selectable to complete at least a portion of the query. In implementations, some of the suggested phrases may include a visual indicator representing a term that is a subject of the query and which is missing from a respective suggested phrase.

In embodiments, a query is received via a text field where the query is formed as a phrase in a human-readable language. A result of the query is displayed in the text field. Then, a selection of a portion of the query is received. In response to receiving the selection of the portion of the query, multiple options are presented that are selectable to change a term of the phrase to create a modified version of the phrase. In at least some embodiments, an option may be presented with a result to a respective modified version of the query independent of receiving a selection of the option.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview.

Conventional techniques that were used to provide specific data from a website to a user (e.g., via navigation of one or more webpages of a website) may be inefficient with increased complexity of the data. Therefore, these conventional techniques may result in user frustration regarding an amount of time to navigate the website and/or locate the specific data. Techniques involving query formation and modification are described. In the following discussion, a variety of different implementations are described that involve assisting a user in forming a complex query to facilitate a targeted search for particular data.

In one example, a user may input alphanumeric characters into a text field. For instance, a user may begin entering a word such as "train" by inputting the letters "tr". Using the input alphanumeric characters, a list of suggested phrases may be presented that the user may select to populate into the text field to generate a query. The suggested phrases may include suggestions, options, and/or suggested modified versions of a phrase formed by the input alphanumeric characters. A search to identify the suggested phrases can be performed in a particular context (e.g., a sports website) thereby focusing the subject matter of the search toward that particular context. Consequently, the suggested phrases may be directed toward subject matter in which the user is interested, rather than being directed to other users' most common searches. As an example, if the search occurs in the context of exercise equipment (e.g., on an exercise-related website), then the suggested phrases may include corresponding topics having the input letters, such as "weight training equipment", "treadmill", "trampoline", "trampoline accessories", "indoor bike trainer," and so on.

In at least some implementations, as a phrase is entered into a text field, or selected from suggested phrases, the phrase may include a missing term that is represented by a visual indicator, such as a symbol. Accordingly, the missing term may represent the subject of the query. For example, the missing term may be represented by a question mark "?" or other symbol. Continuing with the exercise equipment example described above, an example phrase may include "treadmill top speed is ? mph", "trampoline has ? springs", "treadmill has ? incline settings," and so on.

A search can then be performed on a defined database to identify a result, such as the missing term. Once the result is located, the result may be presented in the text field as a modified version of the phrase that replaces the symbol with the missing term. For example, results of the example queries described above may include "treadmill top speed is 18 mph", "trampoline has 39 springs", "treadmill has 7 incline settings," and so on. Consequently, the user is provided with a result in substantially the same location as the query to reduce screen clutter. Additionally, the phrase entered can be formed as a clause or sentence in a human-readable language.

As employed herein, the term "phrase" may define a sequence of words that form a conceptual unit. A phrase can form a component of a clause or sentence. A phrase can be a single word or multiple words. Further, the phrase may include words arranged in a grammatical construction that act as a unit in a sentence. Thus, the term "phrase" can define any of a variety of words and/or sequences of words.

The term "visual indicator" may define a representation of an object, such as a location in memory having a value and referenced by an identifier. The visual indicator can be a symbol, an alphanumeric character, an image, an icon, and so on. Some additional examples of visual indicators can include a phrase, a word, term, and so on. Thus, the visual indicator can represent a variety of different objects.

As employed herein, the term "human-readable language" may define a communication system in written and/or readable form (e.g., alphanumeric characters and/or symbols) used by humans, rather than machines, to communicate with one another. The human-readable language can include messages, such as words and/or phrases, that are recorded on a medium to enable another person to read and understand the messages. Any suitable human-readable language may be utilized, such as English, Portuguese, Armenian, Russian, Spanish, Italian, French, and so on.

As employed herein, the term "text field" may define a field in a graphical user interface in which text or other data may be entered. Some examples of text fields can include a text box or a text entry box that allows a user to input text information to be used by an application. The text field may include a single-line text box that allows one line of input to be entered, or a multi-line text box that allows more than one line of input to be entered.

The term "application" may refer to computer software that causes a computer to perform useful tasks. Some examples of applications can include a software application, an application program, a mobile app, a desktop application, and so on. Additional examples of applications include web browsers, email programs, word processors, games, utilities, social networking applications, instant messaging applications, and so on. In at least some embodiments, an application may represent a service that is accessible over a network, such as a cloud based service, a distributed application, and so forth. Thus, an application is not limited to functionalities installed locally on a client device.

In the following discussion, an example environment is first described that may employ the techniques described herein. Following this, example implementations are described that employ the techniques described herein. Example procedures are then described which may be performed in the example environment as well as other environments. Consequently, performance of the example procedures is not limited to the example environment or the example implementations, and the example environment and the example implementations are not limited to performance of the example procedures.

Example Environment

Figure 1:
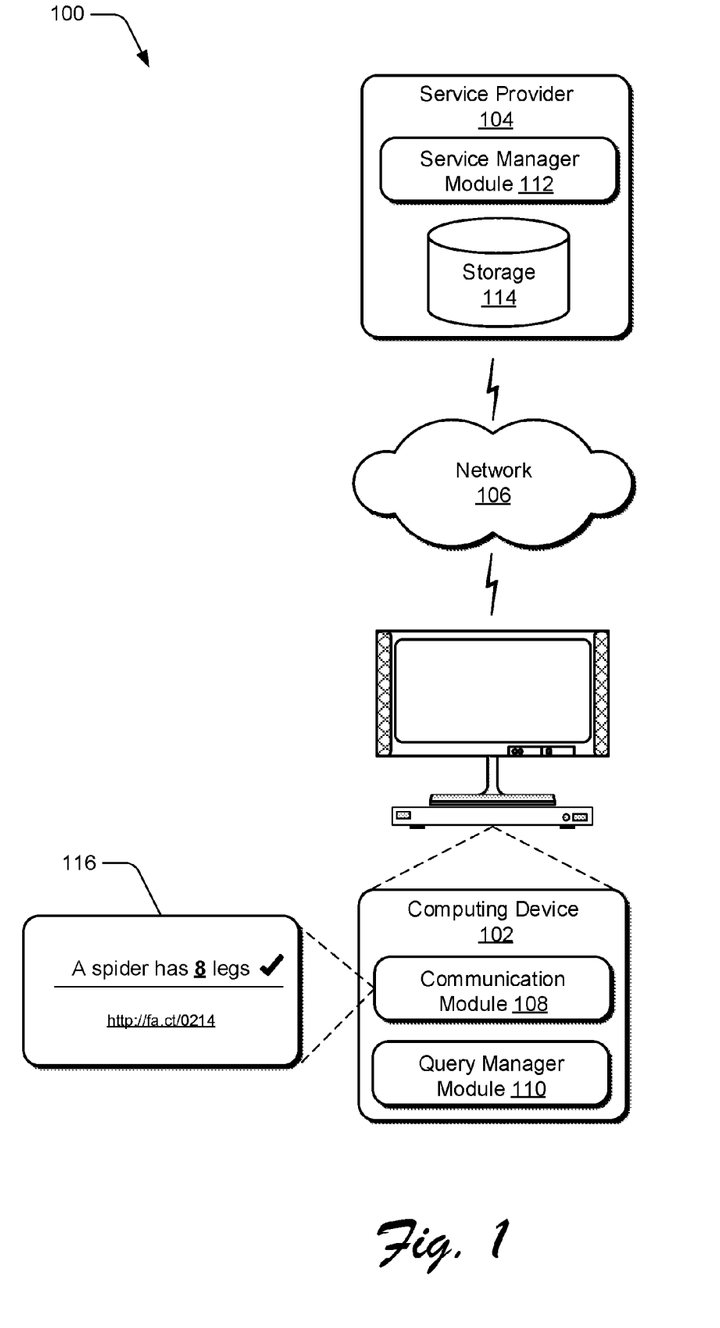
FIG. 1 is an illustration of an environment in an example implementation that is operable to employ query formation and modification techniques.

FIG. 1 is an illustration of an environment 100 in an example implementation that is operable to employ techniques described herein. The illustrated environment 100 includes a computing device 102 and a service provider 104 that are communicatively coupled via a network 106. The computing device 102 as well as computing devices that implement the service provider 104 may be configured in a variety of ways.

The computing devices, for example, may be configured as a desktop computer, a laptop computer, a mobile device (e.g., assuming a handheld configuration such as a tablet or mobile phone), and so forth. Thus, the computing devices may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers of the service provider 104 utilized by a business or other entity to perform operations "over the cloud" as further described in relation to FIG. 10.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be representative of multiple networks.

The computing device 102 is also illustrated as including a communication module 108 and a query manager module 110. The communication module 108 is representative of functionality to communicate via the network 106, such as with one or more services of the service provider 104. As such, the communication module 108 may be configured in a variety of ways. For example, the communication module 108 may be configured as a browser that is configured to "surf the web." The communication module 108 may also be representative of network access functionality that may be incorporated as part of an application, e.g., to provide network-based functionality as part of the application, an operating system, and so on. Thus, functionality represented by the communication module 108 may be incorporated by the computing device 102 in a variety of different ways.

The query manager module 110 is representative of functionality to perform various aspects of the techniques for query formation and modification discussed herein. For instance, the query manager module 110 can assist a user in completing a query as a phrase in a human-readable language. As such, the query manager module 110 may be configured in a variety of ways. For example, the query manager module 110 may be configured to generate and/or present modified versions of the phrase that are selectable to modify the query. In an implementation, the phrase may include a visual indicator representing a term that is missing from the phrase and which is a subject of the query. Additionally, the query manager module 110 may be configured to replace the visual indicator in the phrase with a result of the query to generate a modified version of the phrase. In some implementations, the modified version of the phrase can be presented in a same text field in which the phrase with the visual indicator was initially entered. Further discussion of the query manager module 110 is provided below.

The service provider 104 is representative of functionality to provide one or more network-based services. The service provider 104 may be configured as a website hosting or providing network-based services such as web services. The services are managed by a service manager module 112 to support a variety of different functionality. The services, for instance, may be configured to support query assistance for a user entering a query, database searches based on complex queries, feedback for helping the user formulate the query, and so on. Thus, a variety of different types of functionalities may be performed via services supported by the service provider 104.

The service manager module 112 may be configured to search one or more defined databases, such as storage 114, based on the query. The storage 114 may be a component of the service provider 104, may be remote from the service provider 104, or may be a third-party database. The storage 114 may be a single database, or may be multiple databases, at least some of which include distributed data. Thus, a variety of different types of storage mechanisms can be utilized for the storage 114.

In accordance with techniques discussed herein, a graphical user interface (GUI) 116 is displayed. The GUI 116 indicates a result "8" for a query entered as a phrase "A spider has ? legs." In addition, the GUI 116 indicates a link "http://fa.ct/0214" to a source of the result to enable navigation to the source for verification of the result of the query. Details concerning how the result of the query is determined are presented below. As discussed herein, the result can be presented in substantially the same location on the GUI 116 as the query, such that the query is modified to include the result.

Having described example operating environments in which techniques discussed herein can be employed, consider now a discussion of various embodiments.

Example Implementations

The following discussion describes example graphical user interfaces (GUIs) that can be employed to perform various aspects of techniques discussed herein in accordance with one or more embodiments. The example GUIs may be employed in the environment 100 of FIG. 1, the system 1000 of FIG. 10, and/or any other suitable environment.

Figure 2:
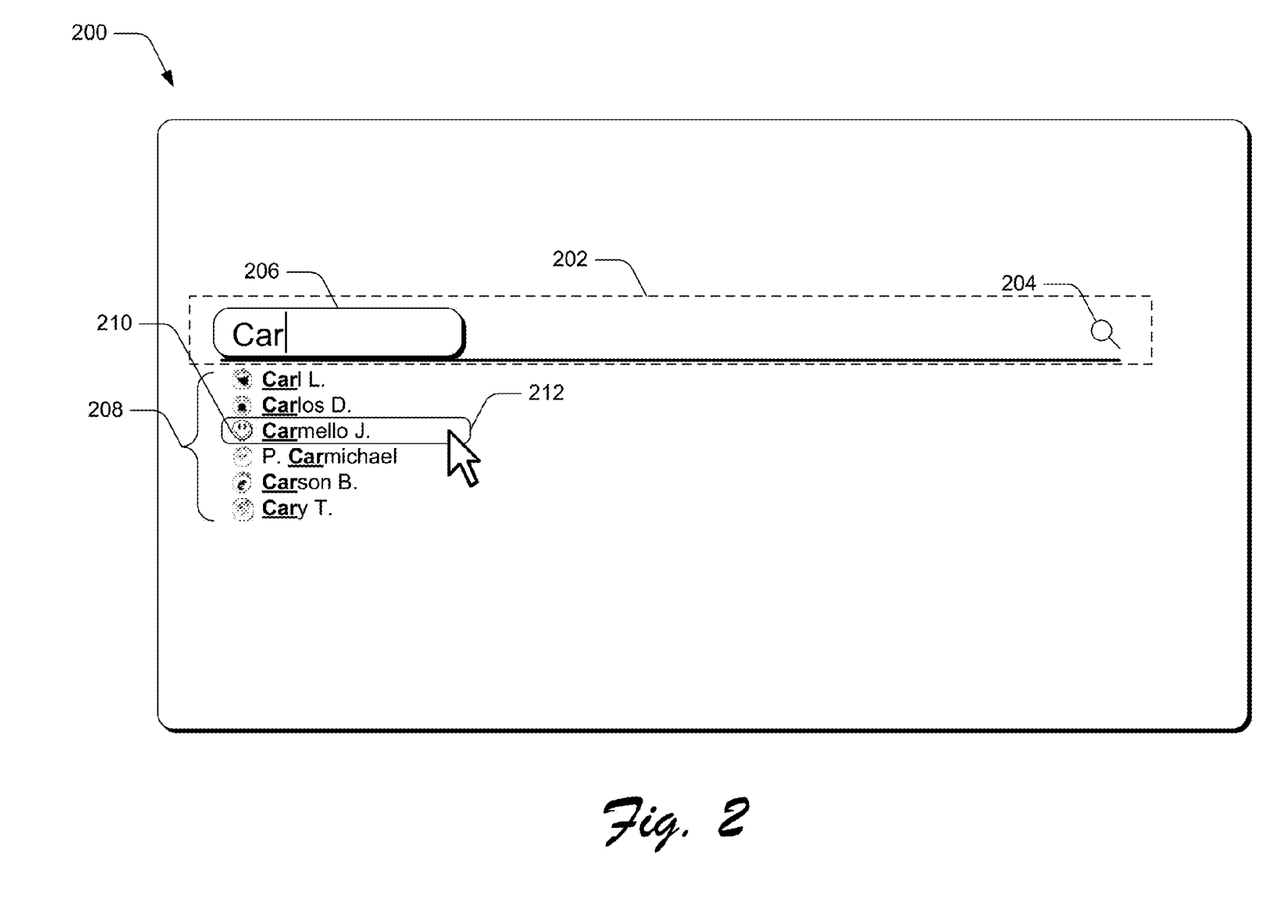
FIG. 2 is an illustration of an example user interface employable to provide options to auto-complete a portion of a query.

FIG. 2 is an illustration of an example graphical user interface (GUI) 200 that can be employed according to various embodiments discussed herein. The GUI 200, for instance, can be employed by the query manager module 110 of FIG. 1 to provide an input mechanism for a user to enter a query. The GUI 200 includes a text field 202, such as a text field, text box, or any other object that is configured to allow a user to input data, such as a string of one or more alphanumeric characters or symbols. In at least some implementations, the input data may form a query as a phrase in a human-readable language.

The GUI 200 may be associated with a particular query context, such as for sports-related queries and/or queries related to other subject matter. Any number of phrases may be entered to form the query. Each additional phrase may provide additional context for the query such as, for example, a name, place, action, or other detail that further defines the query. The phrases may be combined to form a sentence, such as a question, a statement, a fragmented sentence, or any other phrase in a human-readable language.

One or more of the phrases may include a visual indicator representing a missing term that is a subject of the query. Further discussion of the phrases and the visual indicator are provided below.

The GUI 200 also includes a visual indicia 204 representative of a search function that can be selected to initiate a search based on the data entered in the text field 202. In addition, the visual indicia 204 may indicate to a user that the text field 202 is usable to perform a search. In implementations, the query manager module 110 of FIG. 1 may be configured to initiate the search after one or more of the characters are entered in the text field 202. A new search may be initiated after each character is entered in the text field 202. In some embodiments, the GUI 200 may be executed by an application that is associated with a defined database, such as such as the storage 114 in FIG. 1. This association between the application and the defined database may provide some context in which to target the search. The search may be performed to provide one or more suggestions to auto-complete the phrase or a portion of the phrase. By targeting the search to the defined database, the suggestions provided may be more directed to the user's intent than in conventional techniques that use common searches entered by other users.

For example, a user may desire information, such as statistical information, about a particular professional athlete. Thus, the user may input a phrase or a partial phrase into the text field 202 of an application that is associated with a sports database, such as ESPN™ or any other database that stores or accesses sports-related data. In the example illustrated in FIG. 2, the letters "Car" have been entered into the text field 202 to partially form a phrase 206. In response to receiving the letters, the query manager module 110 may automatically initiate a search for suggested phrases that contain the letters input in the text field 202. Alternatively, the query manager module 110 may generate the suggested phrases based on subject matter related to the defined database. Once located or generated, multiple different suggested phrases or options may be presented for the user to select to modify the letters entered in the text field 202, such as to complete the phrase 206.

Continuing with the above example, it may be assumed that the letters can be used to form a name of an athlete. Several example suggested phrases 208 may be provided that include the letters "Car", such as for example, "Carl L.," "Carlos D.," "Carmello J.," "P. Carmichael," "Carson B.," and "Cary T." The suggested phrases 208 may be presented with an associated object. The object may include any of a variety of different objects, such as an image, a photo, a symbol, and so on. For example, the name "Carmello J." may be associated with image 210. In one example, the image 210 may include an image or a photo of a person having the associated name. In some implementations, the suggestions may be scrollable to enable the user to view additional suggestions that are hidden from view based on limited space in the GUI 200.

When a particular suggestion is selected, such as a suggested phrase 212, that particular suggestion may be populated into the text field 202. For example, assume that the name "Carmello J." is selected from the list of suggested phrases 208. Responsive to selection of the suggested phrase 212, the name "Carmello J." can be populated into the text field 202, an example of which is shown in FIG. 3.

Figure 3:
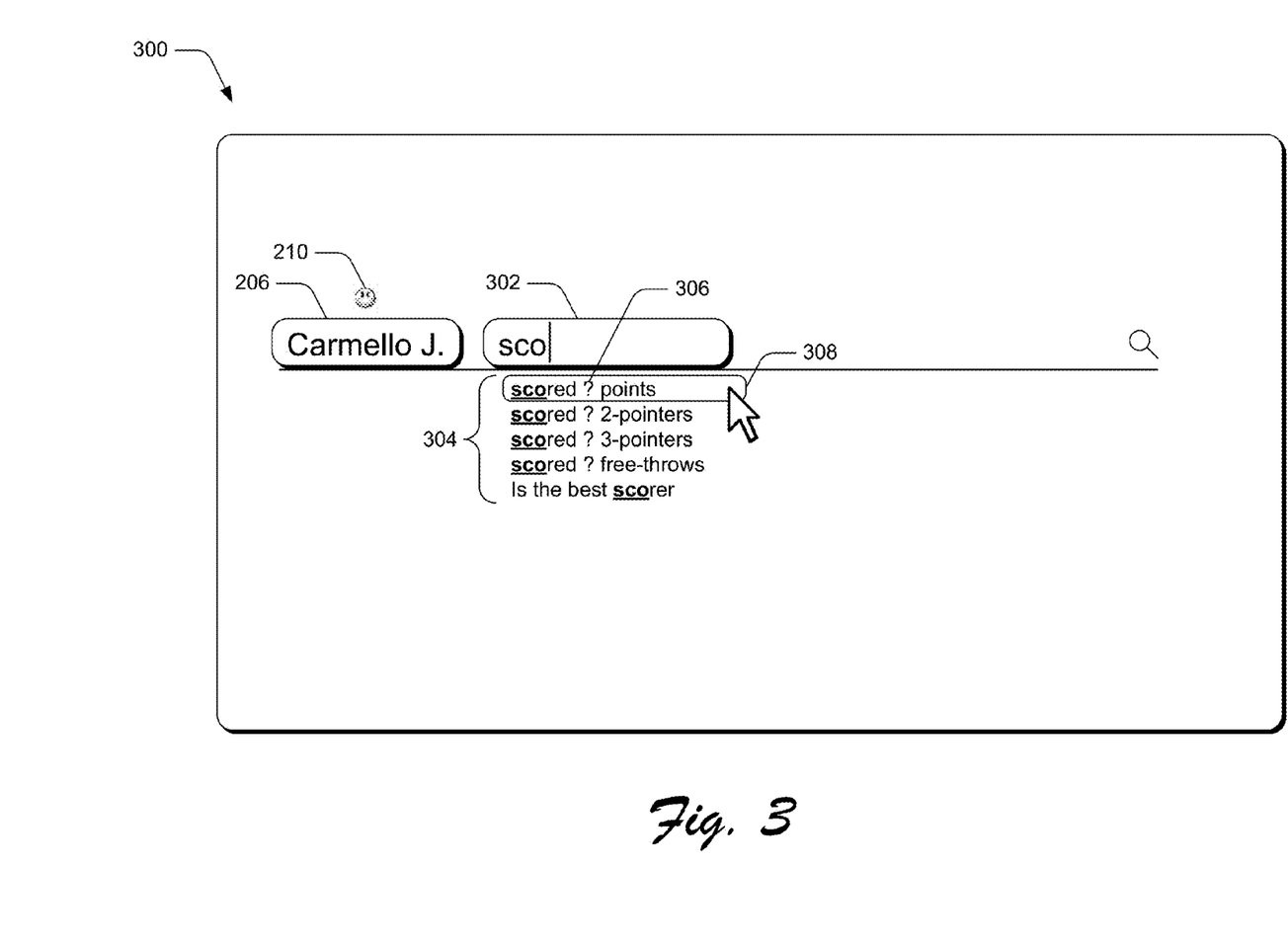
FIG. 3 is an illustration of an example user interface employable to provide additional options to auto-complete an additional portion of the query from FIG. 2.

FIG. 3 is an illustration of an example GUI 300 employable according to various embodiments discussed herein. The GUI 300, for instance, can be employed by the query manager module 110 to provide additional options to auto-complete an additional portion of the query from FIG. 2. In addition to the suggested phrase 212 being populated into the text field 202 as the phrase 206 based on the selection, the image associated with the populated phrase can also be displayed proximate to the phrase in the text field 202. For example, the image 210 may be associated with, and displayed proximate to, the name "Carmello J." Further, the associated image 210 may be selectable to initiate display of additional phrases, or portions of a phrase, to modify the query, further discussion of which can be found below in relation to FIGS. 6 and 7.

Having entered a first phrase (e.g., the phrase 206), the user can now enter an additional phrase, such as the phrase 302, to further complete the query. For instance, the user may input a new partial phrase that includes one or more characters or symbols to initiate a new search for additional suggested phrases for completing the phrase 302. Continuing with the above example, the name "Carmello J." was first entered as the phrase 206, and now the user may enter a verb to correlate the name, or subject, with an action. For example, the new partial phrase containing the letters "sco" is entered in the text field to begin constructing the phrase 302, and in response multiple suggested phrases 304 are presented to assist the user in completing the phrase 302. The suggested phrases 304 may include the letters from the partial phrase in the text field.

In at least some embodiments, the search may utilize the first phrase 206 as context in determining which suggested phrases to present. For example, particular suggested phrases may be specific to a particular subset of information in the defined database, such as a particular subject, sport, market, business, product, service, and so on. In the example illustrated in FIG. 3, the first phrase 206 containing "Carmello J." may be a name of a basketball player. This information may be used to present the suggested phrases 304 that correlate with basketball, such as "scored ? 2-pointers", "scored ? 3-pointers", "scored ? free-throws", and so on. The additional phrase 302 and/or the suggested phrases 304 may include a visual indicator 306 that represents a missing term in the phrase 302 and/or a respective suggested phrase 304, where the missing term is a subject of the query. Any of a variety of different visual indicators 306 may be used to represent the missing term, such as a string of one or more alphanumeric characters or symbols. The missing term can be any of a variety of missing terms in the phrase. For example, at least some of the suggested phrases 304 include a question mark to indicate a request for information, such as a number of points scored, a number of 2-pointers scored, a number of free-throws, and so on. Thus, a variety of different information, such as factual information, can be represented by the visual indicator 306.

Figure 4:
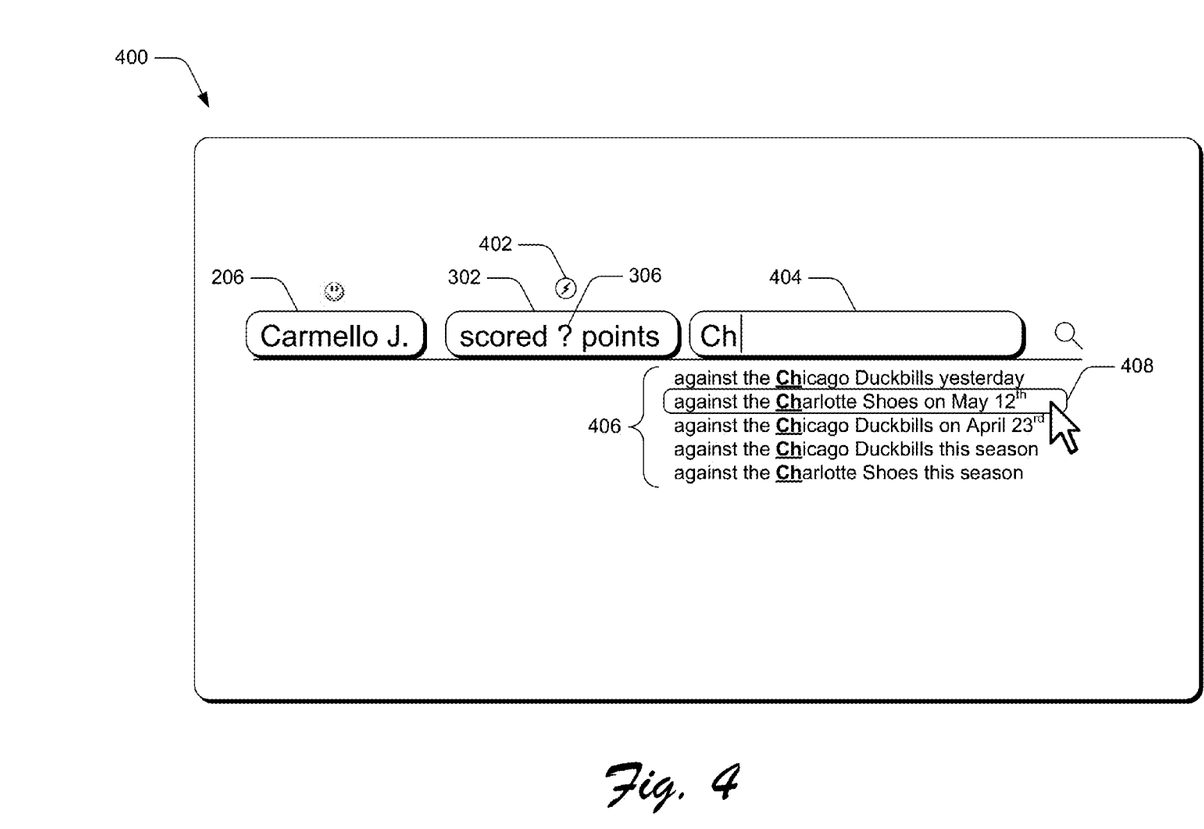
FIG. 4 is illustration of an example user interface employable to provide additional options to auto-complete an additional portion of the query from FIG. 3.

Continuing with the above example, assume the user selects suggested phrase 308 that states "scored ? points". The selected suggested phrase 308 may then be populated in the text field as the phrase 302 to modify the partial phrase (e.g., letters "sco") previously entered. An example of this is illustrated in FIG. 4. Alternatively, the user may enter the phrase 302 directly into the text field via an input device, such as a keyboard, rather than selecting the suggested phrase.

Consider now FIG.4, which is an illustration of an example GUI 400 employable according to various embodiments discussed herein. The GUI 400, for instance, may be employed by the query manager module 110 to provide additional options to auto-complete an additional portion of the query from FIG. 3. As illustrated in the example shown in FIG. 4, the suggested phrase 308 selected in FIG. 3, stating "scored ? points", has been populated into the text field as the phrase 302. In addition, an associated image 402 may be displayed proximate to the phrase 302. The associated image 402 may provide an indication of a variety of information. For instance, the associated image 402 may indicate that the corresponding phrase includes one or more missing terms, such as the missing term represented by the visual indicator 306. Alternatively or additionally, the image 402 may indicate that the associated phrase includes an action, a noun, an adjective, or any other particular part of speech. Thus, a variety of information can be represented by the associated image 402.

In the example shown in FIG. 4, additional letters have been entered in the text field 202 to begin constructing a third phrase 404. Using both the first phrase 206 and the second phrase 302 as context, additional suggested phrases 406 may be provided that include the additional letters. For example, the letters "Ch" are entered in the text field, causing the suggested phrases 406 to be presented that include the letters "Ch", such as "against the Chicago Duckbills yesterday," "against the Charlotte Shoes on May $12^{th}$," and so on. Note that the suggested phrases 406 may not begin with the letters input in the text field 202. Rather, the suggested phrases 406 may include the letters in any part of any word in the suggested phrases 406.

Assume for example that the user selects one of the suggested phrases 406, such as selected phrase 408 stating "against the Charlotte Shoes on May $12^{th}$." This selected phrase 408 may then be populated into the text field as the phrase 404.

Figure 5:
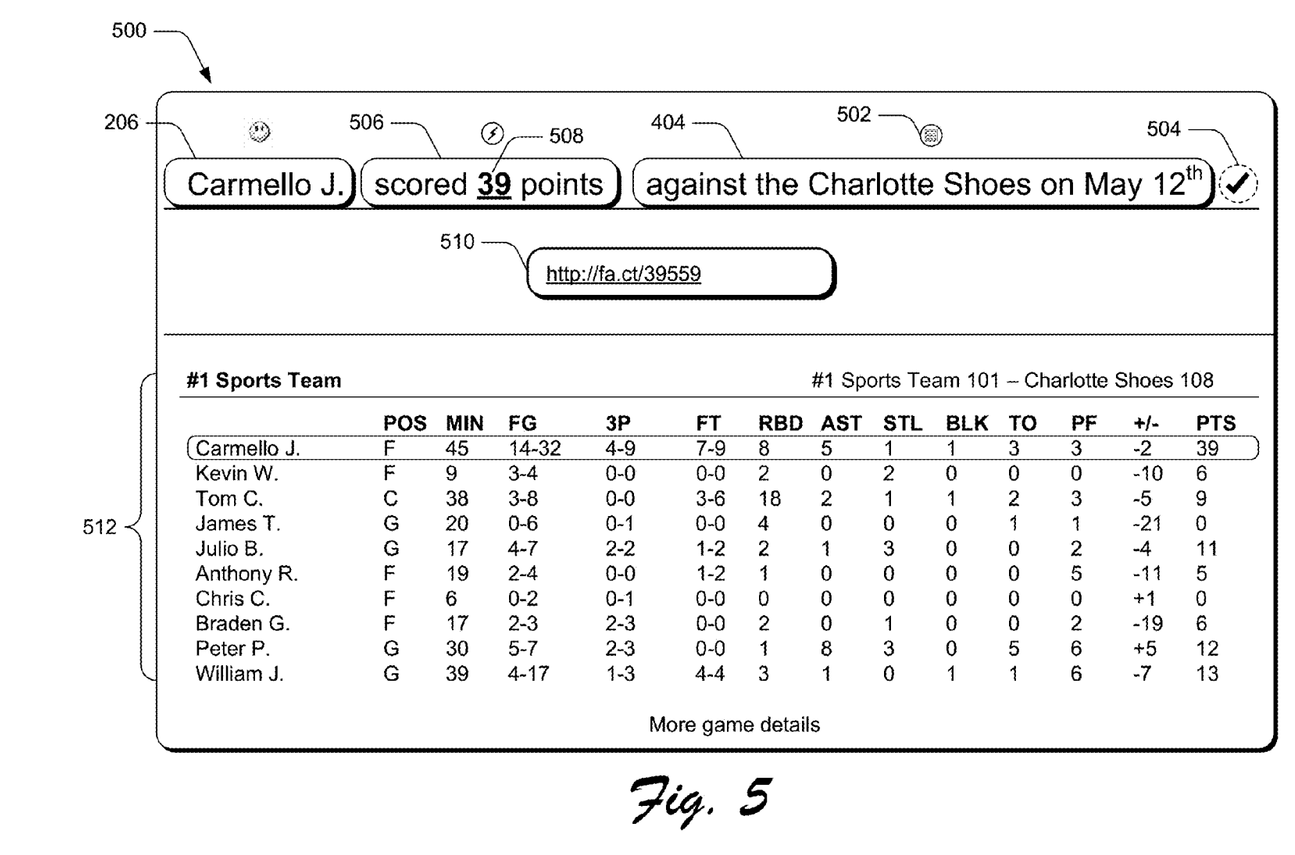
FIG. 5 is an illustration of an example user interface employable to present results to the query from FIG. 4.

FIG. 5 illustrates an example GUI 500 employable according to the techniques discussed herein. The GUI 500 may be employed by the query manager module 110 to present results to the query from FIG. 4. An image, such as image 502 may be associated with the phrase 404 to indicate a variety of information, examples of which are described above.

When the text field 202 includes sufficient information to search for a result of the query, or phrases populated in the text field form a correctly articulated phrase, then the query may be complete. In one example, a correctly articulated phrase may form a clause or a sentence. In response to completion of the query, a visual indicia, such as object 504, may be presented to indicate to the user that the query is valid and/or complete. The object 504 may replace the visual indicia 204 in FIG. 2 that is representative of the search function, or the object 504 may be presented independent of the visual indicia 204. The object 504 may be presented conspicuously to notify the user that the phrase is validated. Any suitable validation technique may be utilized to determine whether the phrases in the text field are correctly articulated. For instance, the validation technique may include grammar analysis, spelling analysis, or other technique employable based on language rules associated with the human-readable language to validate the phrases as being correctly formulated.

In implementations, a result of the query search may be presented in the text field as a modified version of the phrase. For instance, a modified version 506 of the phrase 302 may replace the visual indicator 306 that was used in the phrase 302 to represent the missing term. Accordingly, the result of the query may include the missing term. Continuing with the above example, a query result 508 has replaced the visual indicator 306 from FIG. 4 in the phrase 302 to notify the user that the number of points scored by the person named Carmello J. within the context of the game against the Charlotte Shoes on May $12^{th}$ was "39" points. In this way, screen clutter may be reduced because the result of the query is presented in the same or substantially the same location in the GUI as the phrases that formed the query.

In addition, an identifier of a source of the query result 508, such as link 510, may be provided to enable the user perform one or more actions. In at least one embodiment, the identifier may include an address of the source of the query result 508. In one or more implementations, the user may use the link 510 to navigate to the source of the query result 508 to verify the information in the query result 508. Additionally, the user may share the link 510 via one or more applications, such as a social networking application, email application, instant messaging application, and so on.

Additional data from the source may also be presented in the GUI 500. For instance, FIG. 5 illustrates additional statistical data 512 corresponding to the player Carmello J. for the particular game, as well as data corresponding to multiple other players on the same team and/or the opposing team from the particular game. A variety of different data may be presented in addition to the modified version 506 of the phrase.

Figure 6:
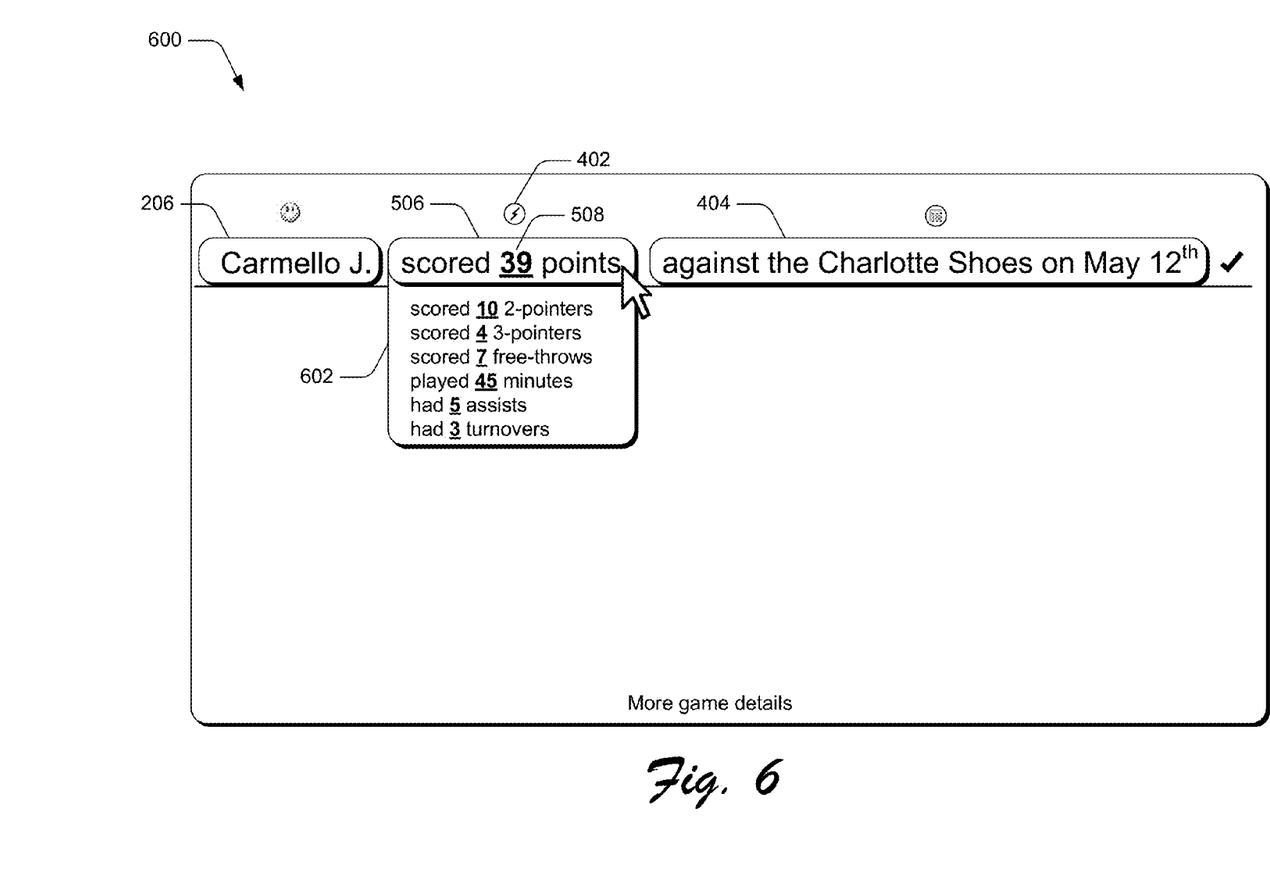
FIG. 6 is an illustration of an example user interface employable to present modified versions of a phrase in the query.

Consider now FIG. 6, which is an illustration of an example GUI 600 employable according to the techniques discussed herein. The GUI 600 can be employed, for instance, by the query manager module 110 to present modified versions of query results from FIG. 5. For example, one or more phrases used to form the query may be selectable to present additional, modified versions of a selected phrase. In at least some embodiments, an image associated with a phrase, such as the image 402, may be selected to initiate display of additionally modified versions 602 of the associated phrase. If the query is complete and/or has been validated, the additionally modified versions 602 of the selected phrase 506 that are presented may each include a result of a respective modified version of the query.

For example, in FIG. 6, the modified version 506 of the phrase 302 is illustrated as being selected via a cursor, and a list of additionally modified versions 602 of the modified version 506 of the phrase 302 are presented. These additionally modified versions 602 may be presented as suggested phrases that modify and/or complete the query. In addition, the additionally modified versions 602 may utilize the other phrases in the query as context. At least some of the additionally modified versions 602 may replace the query result 508 with a respective result corresponding to a modified query that is based on a respective additionally modified version 602. In this way, the user can quickly view results of modified queries that may be similar to particular data in which the user is interested without having to input a new phrase for each modified query.

In addition, at least one of the phrases in the query may be modified to cause the visual indicator, or a query result, in another of the phrases to be automatically replaced with a result of a modified query. For instance, consider the following example.

Figure 7:
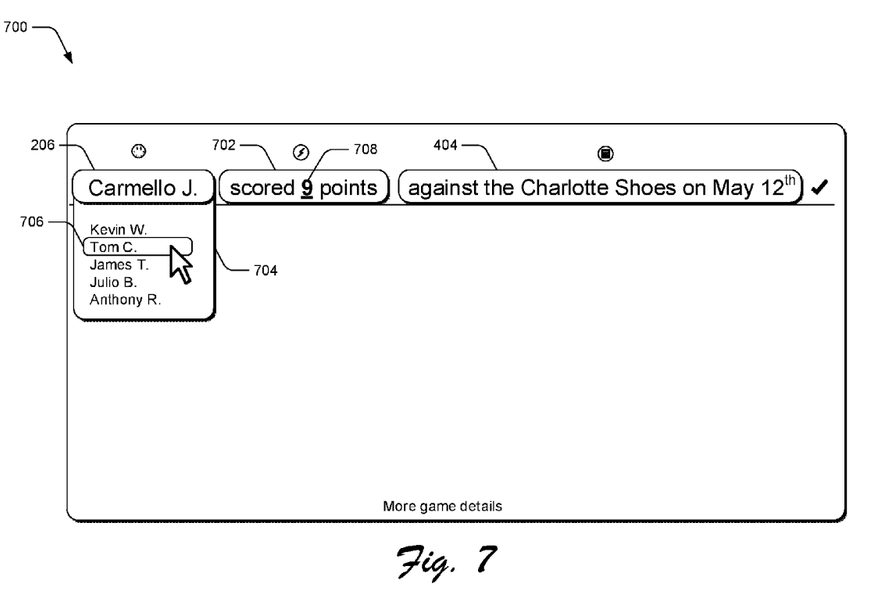
FIG. 7 is a flow diagram depicting a procedure in an example implementation in which query formation and modification techniques are employed.

FIG. 7 is an illustration of an example GUI 700 employable according to various embodiments discussed herein. The GUI 700, for instance, can be employed by the query manager module to present modified versions of query results from FIG. 5. Continuing with the example described above, the query may include multiple phrases, such as the phrases 206, 702, and 404. As illustrated, the query entered in the text field is indicated as being complete by the check mark at the end of the last phrase. After completing the query and receiving the result of the query, the user may select one of the phrases to modify the query.

For example, the phrase 206 may be selected, as illustrated in FIG. 7, to cause a list of suggested modified versions 704 of the phrase 206 to be displayed, such as one or more alternative phrases. A user may select or highlight one of the suggested modified versions 704 to modify the query. By selecting, or hovering the cursor over, one of the suggested modified versions 704, the result of the original query may be automatically replaced with a modified result that corresponds to the selection. For instance, as the user selects, or hovers the cursor over, suggested phrase 706 (e.g., "Tom C."), a new query result 708, which corresponds to a number of points scored by "Tom C.", automatically replaces the previous query result 508 from FIG. 6 that corresponded to the number of points scored by "Carmello J." (e.g., the phrase 206). Thus, in response to one or more of the phrases of the query being modified, one or more other phrases of the query may be automatically modified to present a new query result corresponding to a modified query that is based on the modified phrase.

Thus, the example GUIs discussed above illustrate that as a phrase is entered into a text field to form a query, multiple modified versions of the phrase in are presented as suggestions that a user can select to populate into the text field to modify the query. In some implementations, the query may be formed as a sentence in a human-readable language. In addition, the example GUIs discussed above illustrate that a query result can be presented in the text field as a modified version of the phrase.

Having described various embodiments of example GUIs, consider now a discussion of various example procedures.

Example Procedures

The following discussion describes example procedures for query formation and modification that may be implemented in a variety of different environments, such as the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In addition, any combination of operations from the different procedures described herein may be utilized. In portions of the following discussion, reference will be made to the environment 100 of FIG. 1.

Figure 8:
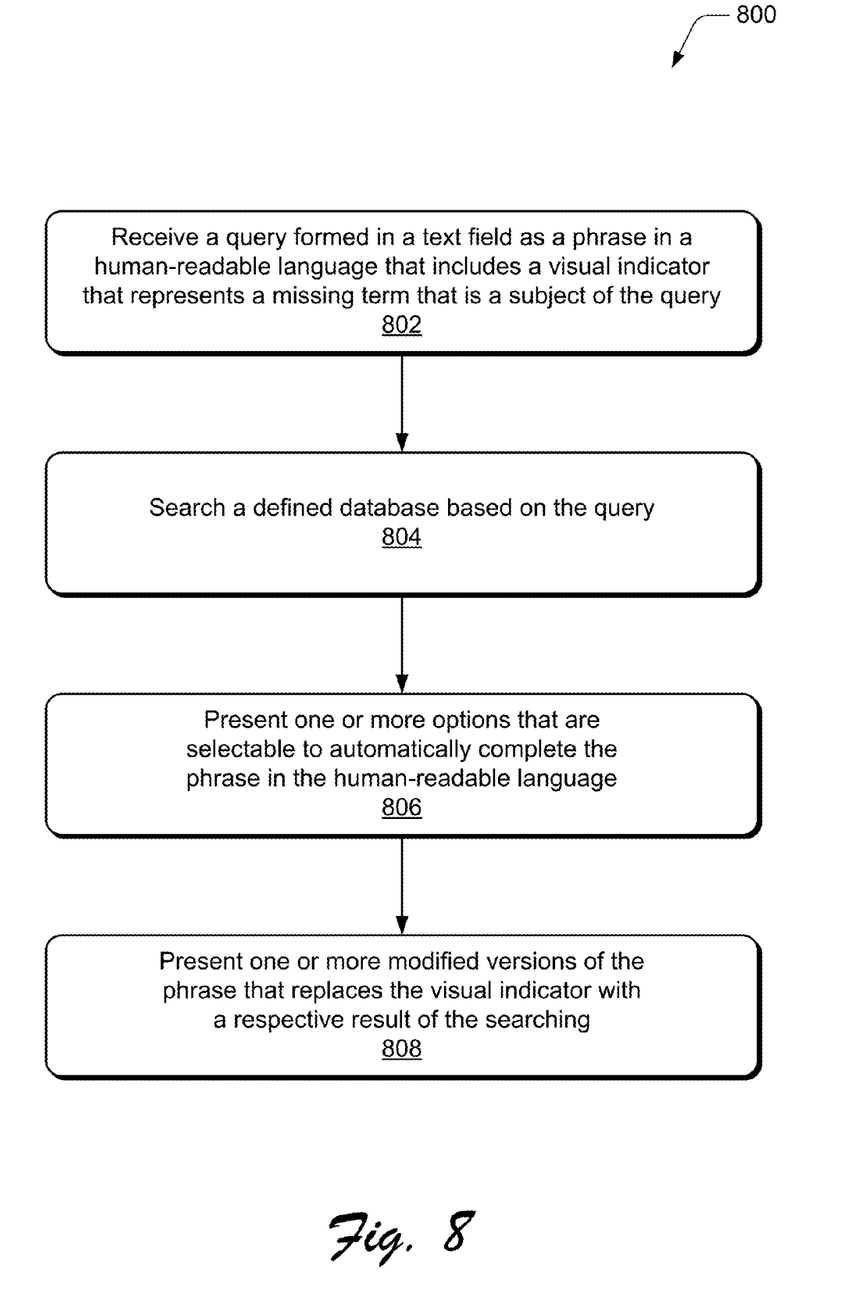
FIG. 8 is a flow diagram depicting a procedure in an example implementation in which query formation and modification techniques are employed.

FIG. 8 is a flow diagram depicting a procedure 800 in an example implementation in which query formation and modification techniques are employed. A query is received that is formed in a text field as a phrase in a human-readable language that includes a visual indicator representing a missing term that is a subject of the query (block 802). This step can be performed in any suitable way. For instance, the query can include any suitable phrase, such as one or more of a subject, a verb, and/or a context. In implementations, the query may form a complete sentence in the human-readable language or an incomplete sentence. The query, for instance, can include one phrase or multiple phrases.

A defined database is searched based on the query (block 804). Any suitable database may be utilized. In at least some embodiments, the database may be configured as a collection of information that is related to a particular topic or subject matter, such as sports, politics, news, toys, finance, games, and so on. The database may be hosted by or associated with a website or other entity that collects or provides data related to a particular topic or subject matter, such as sports (e.g., provided by "ESPN™"), weather (e.g., provided by "The Weather Channel™"), politics (e.g., provided by "Business Week™"), and so on. In some implementations, the defined database may be configured as a subset of another database, such that a search can be performed based on one or more filters narrowing the search to the particular subject matter, examples of which include financial information at "Yahoo.com™" or "CNN-Money™", football information at "Fox Sports™" or "ESPN™", and so on.

As previously discussed, the defined database may be a single database, or may be multiple databases, at least some of which include distributed data. In addition, the defined database may be associated with an application executing a GUI via which the query is entered, examples of which are discussed above. In this way, suggested modified versions of the phrase or auto-complete suggestions may be better targeted to the user's intent, and random results of the search may be reduced.

One or more options are presented that are selectable to automatically complete the phrase in the human-readable language (block 806). This step can be performed in any suitable way, such as in accordance with the embodiments discussed above with respect to FIGS. 2-4, 6, and 7. For example, the phrase may be selected to cause display of one or more options, such as suggested phrases that, if selected, may be populated into the text field to automatically complete the phrase. For instance, a variety of different auto-complete techniques may be utilized to present the suggested phrases.

One or more modified versions of the phrase are presented that replace the visual indicator with a respective result of the searching (block 808). This step can be performed in any suitable way. For example, the phrase displayed in the text query may have the visual indicator representing a missing term in the phrase. The search may result identifying in the missing term, and the missing term identified in the search can replace the visual indicator in the phrase to present a modified version of the phrase to the user. Accordingly, the query result can be presented in the same text field in which the query was entered. In this way, display space in the GUI may be conserved, and screen clutter reduced.

Figure 9:
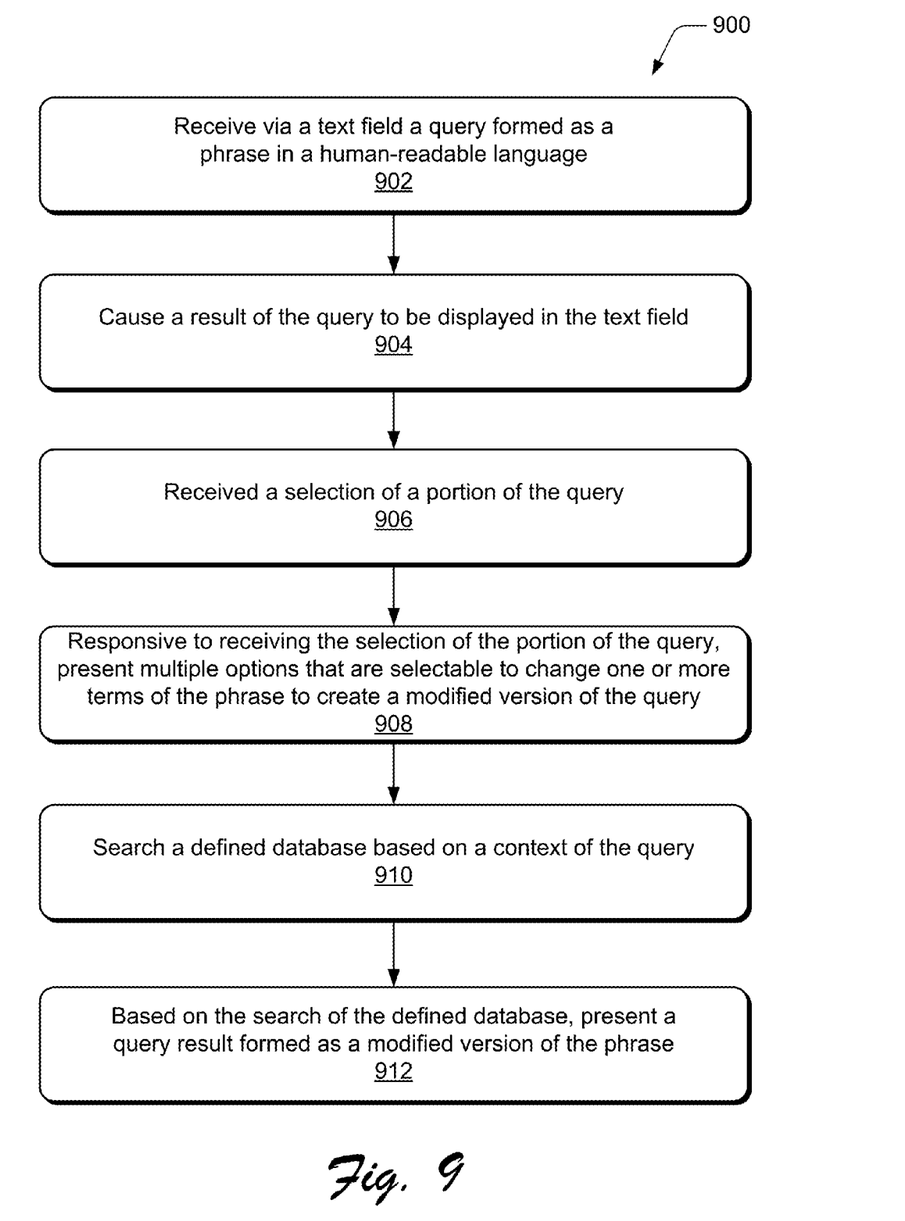
FIG. 9 is a flow diagram depicting a procedure in an example implementation in which query formation and modification techniques are employed.

Consider now FIG. 9, which is a flow diagram depicting a procedure 900 in an example implementation of in which query formation and modification techniques are employed. A query formed as a phrase in a human-readable language is received via text field (block 902). This step can be performed in any suitable way, examples of which are described above.

A result of the query is caused to be displayed in the text field (block 904). This step can be performed in any suitable way. For example, the phrase may include a visual indicator representing a missing term in the phrase. The result of the query may include the missing term, and the result can be displayed in the text field by replacing the visual indicator with the missing term.

A selection of a portion of the query is received (block 906). This step can be performed in any suitable way, examples of which are described above. Responsive to receiving the selection of the portion of the query, multiple options are presented that are selectable to change one or more terms of the phrase to create a modified version of the query (block 908). For example, when a user selects or hovers a cursor over a portion of the phrase, a list of suggested phrases may be presented. The user may then select one of the suggested phrases to populate the selected phrase into the text field as a replacement to the selected portion of the query. The query may be modified by populating the selected phrase into the text field in place of the selected portion of the query.

A defined database is searched based on a context of query (block 910). This step can be performed in any suitable way, examples of which are described above. In at least one embodiment, the search may be based on the selected suggested phrase. In addition, the search may be based on a context of the query provided by one or more other phrases in the query. For instance, the query may include multiple phrases that each provide some context for the search. Further examples are described above.

Based on the search of the defined database, a query result is presented formed as a modified version of the phrase (step 912). This step can be performed in any suitable way. For example, the query result may be presented in the same or substantially the same location in a GUI as the phrase. In at least some embodiments, the query result may be presented in the text field in which the phrase was entered, such that the phrase is replaced with the modified version of the phrase that includes the query result. In implementations, the modified version of the phrase may replace a visual indicator that was used in the phrase to represent a missing term. Accordingly, the query result may include the missing term from the phrase.

Example System and Device

Figure 10:
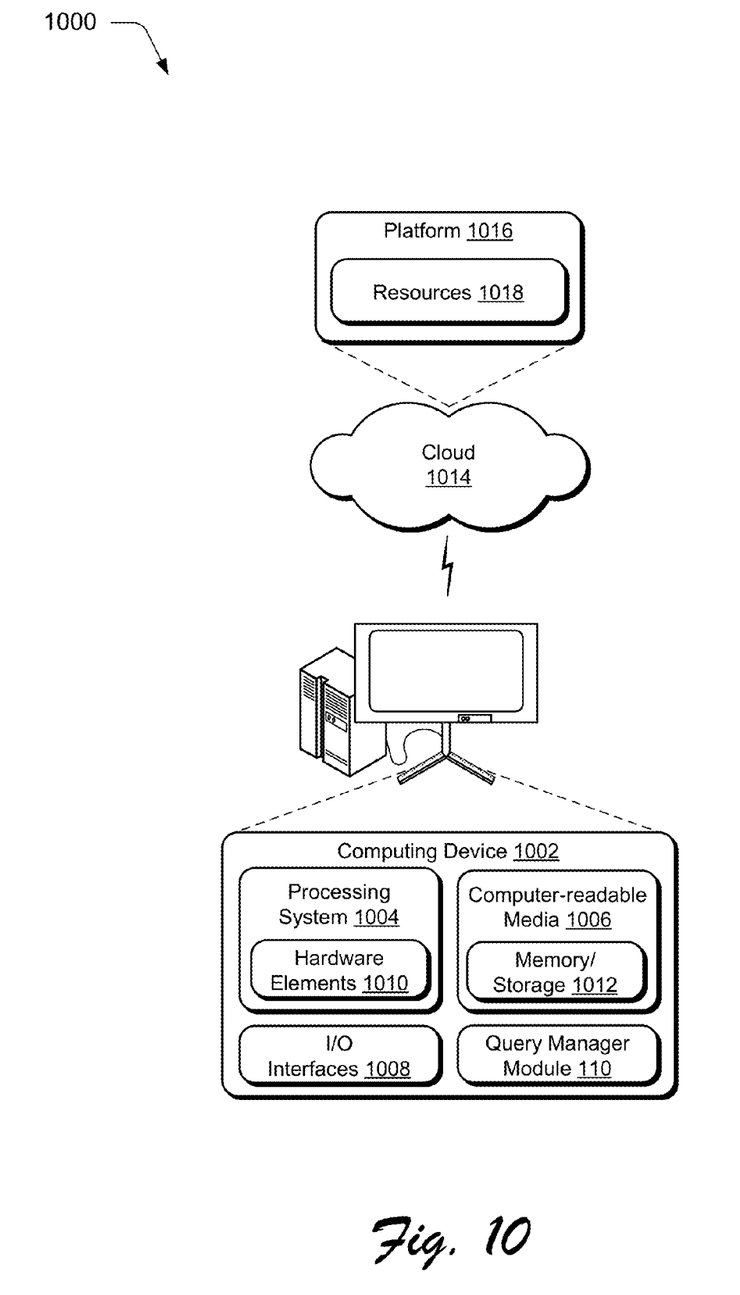
FIG. 10 illustrates various components of an example device that can be implemented as any type of computing device (such as described with reference to FIG. 1) to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the query manager module 110, which may be configured to assist a user in forming a complex query to facilitate a targeted search for particular data by at least providing suggested phrases for the user to select to complete the query, and providing a modified version of the selected phrase as a result of the search. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

The input/output interface(s) 1008 are representative of functionality to allow a user to enter commands and information to the computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media refers to non-signal bearing media and does not include signals per se. The computer-readable storage media includes hardware such as volatile and nonvolatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1010 and the computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more of the hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of the computer-readable storage media and/or the hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of the platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. The resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. One or more computer readable storage media storing instructions that, responsive to execution by a computing device, cause the computing device perform operations comprising:
   receiving via a text field a query formed as a phrase in a human-readable language, the query including a visual indicator representing a missing term in the phrase that is a subject of the query;
   causing a result of the query to be displayed in the text field by replacing the visual indicator in the text field with the result of the query;
   receiving a selection of a portion of the query that does not include the visual indicator;
   responsive to receiving the selection of the portion of the query, presenting multiple options that are selectable to change at least one term of the selected portion to create a modified version of the query; and
   responsive to detecting a cursor hovering over one of the multiple options, automatically replacing the result of the query with a modified result that corresponds to the one of the multiple options.

2. The one or more computer readable storage media of claim 1, wherein the operations further comprise searching a defined database responsive to the selection of the portion of the query to identify the multiple options.

3. The one or more computer readable storage media of claim 1, wherein the phrase comprises a sentence.

4. The one or more computer readable storage media of claim 1, wherein the visual indicator comprises a non-text character that represents a request for particular data.

5. The one or more computer readable storage media of claim 1, wherein the visual indicator includes at least one of punctuation, a symbol, or an alphanumeric character.

6. The one or more computer readable storage media of claim 1, further comprising presenting an image proximate to the portion of the query, the image visually representing at least one characteristic of the portion of the query.

7. The one or more computer readable storage media of claim 1, wherein the phrase includes at least one of a subject, a verb, or a context.

8. The one or more computer readable storage media of claim 1, wherein:
   multiple modified versions of the phrase are presented responsive to selection of an additional portion of the phrase that includes the visual indicator; and
   the multiple modified versions of the phrase are each presented with a different respective result of the query that is modified based on a respective modified version of the phrase.

9. A method comprising:
   receiving via a text field a query formed as a phrase in a human-readable language, the query including a visual indicator representing a missing term in the phrase that is a subject of the query;
   displaying a result of the query in the text field by replacing the visual indicator in the text field with the result of the query;
   receiving a selection of a portion of the query that does not include the visual indicator;
   responsive to receiving the selection of the portion of the query, presenting multiple options that are selectable to change at least one term of the selected portion to create a modified version of the query; and
   responsive to detecting a cursor hovering over one of the multiple options, automatically replacing the result of the query with a modified result that corresponds to the one of the multiple options.

10. The method of claim 9, further comprising searching a defined database responsive to the selection of the portion of the query to identify the multiple options.

11. The method of claim 9, wherein the phrase comprises one of a sentence or a clause.

12. The method of claim 9, wherein the visual indicator comprises a non-text character that represents a request for particular data.

13. The method of claim 9, wherein the visual indicator includes at least one of punctuation, a symbol, or an alphanumeric character.

14. The method of claim 9, further comprising presenting an image proximate to the portion of the query, the image visually representing at least one characteristic of the portion of the query.

15. The method of claim 9, wherein the phrase includes at least one of a subject, a verb, or a context.

16. A system comprising:
    at least one processor; and
    a query module including instructions executable by the at least one processor to perform operations including:
    receiving via a text field a query formed as a phrase in a human-readable language, the query including a visual indicator representing a missing term in the phrase that is a subject of the query;
    causing a result of the query to be displayed in the text field by replacing the visual indicator in the text field with the result of the query;
    receiving a selection of a portion of the query that does not include the visual indicator;
    responsive to receiving the selection of the portion of the query, presenting multiple options that are selectable to change at least one term of the selected portion to create a modified version of the query; and
    responsive to detecting a cursor hovering over one of the multiple options, automatically replacing the result of the query with a modified result that corresponds to the one of the multiple options.

17. The system of claim 16, wherein the operations further comprise searching a defined database responsive to the selection of the portion of the query to identify the multiple options.

18. The system of claim 16, wherein the phrase comprises a sentence.

19. The system of claim 16, wherein the visual indicator comprises a non-text character that represents a request for particular data.

20. The system of claim 16, wherein:
multiple modified versions of the phrase are presented responsive to selection of an additional portion of the phrase that includes the visual indicator; and
the multiple modified versions of the phrase are each presented with a different respective result of the query that is modified based on a respective modified version of the phrase.

* * * * *